United States Patent [19]

Beuther

[11] Patent Number: 4,786,344

[45] Date of Patent: Nov. 22, 1988

[54] EVACUATED DUAL PANE WINDOW STRUCTURE

[75] Inventor: Paul D. Beuther, Granville, Ohio

[73] Assignee: Owens-Corning Fiberglas Corporation, Toledo, Ohio

[21] Appl. No.: 923,460

[22] Filed: Oct. 27, 1986

[51] Int. Cl.⁴ .......................... E06B 3/24; E06B 7/12; B32B 17/00

[52] U.S. Cl. .................................. 156/109; 52/790; 428/34

[58] Field of Search ................. 52/171, 172; 428/34, 428/13, 398; 156/109, 107; 65/43

[56] References Cited

U.S. PATENT DOCUMENTS 3,902,883 9/1975 Bayer ........................................ 65/43
3,990,201 11/1976 Falbel .

4,683,154 7/1987 Benson ................................. 52/171

OTHER PUBLICATIONS

Laser Sealed Evacuated Window Glazings, SERI/TP-255-2454, Benson, David K., Solar Energy Research Institute.

Primary Examiner—John E. Murtagh
Attorney, Agent, or Firm—Ted C. Gillespie

[57] ABSTRACT

The method of making the panel includes the steps of flooding one of the panes with the spherical members and a liquid. The liquid is evaporated. Positioning another pane on top of the spherical supporting elements and followed by drawing a vacuum on the space between the dual pane window structure and joining the edges of the panes.

5 Claims, 1 Drawing Sheet

EVACUATED DUAL PANE WINDOW STRUCTURE

TECHNICAL FIELD

This invention relates generally to evacuated dual pane windows, and more particularly to a more economical construction therefor.

BACKGROUND ART

U.S. Pat. No. 3,990,201 discloses an evacuated dual pane window construction wherein mica spacers are disposed between the glass panes in a regular, square grid pattern one inch apart. Regularly spaced spherical support spacers 5 to 10 millimeters in diameter have also been used.

DISCLOSURE OF INVENTION

In accordance with the invention, the glass panes are spaced, and supported against atmospheric and wind pressure, by randomly disposed spheres 10 to 1000 microns in diameter.

BRIEF DESCRIPTION OF THE DRAWINGS

The invention is more fully explained hereinafter, reference being had to the accompanying drawings wherein.

BEST MODE OF CARRYING OUT THE INVENTION

Figure 1:
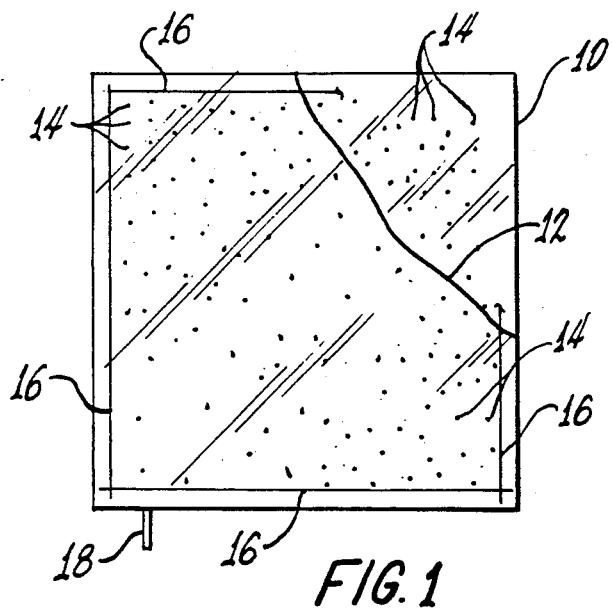
FIG. 1 is a fragmentary schematic flatwise view of a window showing one stage in the manufacture thereof in accordance with the invention.

With reference to the drawings, FIG. 1 shows a first glass pane 10 and a second glass pane 12 separated by a plurality of randomly disposed spheres or supporting spacers 14. Also shown between the panes along their edge portions are leaded glass filaments or ribbons 16, and a glass tube 18.

Figure 2:
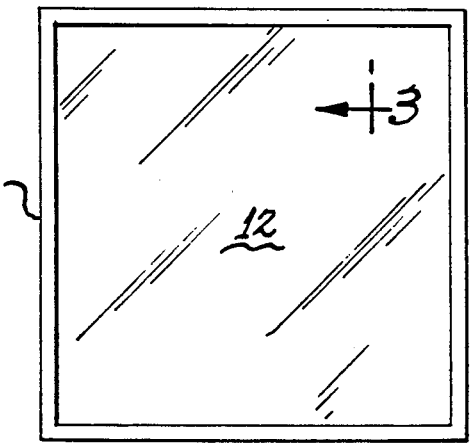
FIG. 2 is a flatwise view of a finished window unit constructed in accordance with the invention.
Figure 3:
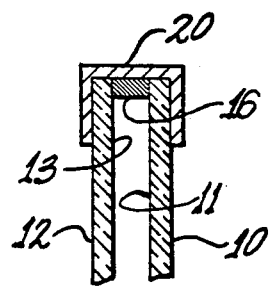
FIG. 3 is a fragmentary sectional view taken along the line 3—3 of FIG. 2.

At least one of the two glass panes 10 and 12 is coated with a low emissivity coating such as silver coatings 11 and 13 (FIG. 3), for suppression of radiative heat transfer. The first glass pane 10 is sprayed in horizontal position with a mixture of distilled water and the spherical supporting spacers 14. After the water dries, the spheres 14 will be randomly spaced on the glass pane 10. The leaded glass filaments or ribbons 16 are placed along the edge portions of the pane 10, and the second glass pane 12 is placed on top of the spheres 14 and filaments or ribbons 16. The glass tube 18 is fused to the edges of the glass panes 10 and 12 and the edge portions thereof are locally heated to fuse with the leaded glass filaments or ribbons 16 and provide a seal without damaging the low emissivity coating or coatings 11 and 13. A vacuum pump is connected to the tube 18 and the space between the panes 10 and 12 is evacuated to about $10^{-5}$ Torr. The glass tube 18 is melted off and the resulting window is mounted in a frame 20 (FIGS. 2 and 3).

The spheres 14 can be made of many materials, including glass, but a material of lower heat conductivity, such as polystyrene, is preferred. The spheres 14 should all be the same size and within a size range of ten to one thousand microns in diameter. The average spacing from each other in their random disposition may be about one-half to one inch apart.

Various modifications may be made in the structure shown and described without departing from the spirit and scope of the invention.

I claim:

1. A method of making a multi-pane window structure comprising:

applying a mixture of a liquid and spherical spacing members to a substantially horizontally disposed first glass pane to randomly dispose the spacing members on the pane and to temporarily locate the spacing members on the pane;

evaporating the liquid from the pane and spacing members;

positioning a second glass pane on top of the first pane, the spacing members being located there between;

drawing a vacuum on the space between the panes to bow the panes sufficient to fixedly located the spacing members there between in the absence of fusing or adhesively bonding the spacing members to either pane; and joining the panes to permanently seal the evacuated space.

2. The method of claim 1 wherein said liquid is distilled water.

3. The method of claim 2 wherein the spherical members are selected from the group consisting of glass and polystyrene.

4. The method of claim 1 further comprising positioning fusible elements along the edge portions of the panes and wherein the panes are joined by fusing the panes to the fusable elements.

5. The method of claim 4 wherein the fusible elements are leaded glass filaments or ribbons.

* * * * *